Aug. 28, 1934.   K. L. HERRMANN   1,971,782

ROLLER BEARING

Filed Sept. 30, 1933

INVENTOR.
BY Karl L. Herrmann
ATTORNEY

Patented Aug. 28, 1934

1,971,782

UNITED STATES PATENT OFFICE 1,971,782

ROLLER BEARING

Karl L. Herrmann, South Bend, Ind.

Application September 30, 1933, Serial No. 691,583

1 Claim. (Cl. 308—174)

This invention relates to roller bearings designed particularly for heavy duty service and more especially to roller bearings of the type having cylinders or rollers arranged for carrying the radial thrust and conical rollers arranged at both sides of the cylindrical rollers for assisting in taking up the radial thrust as well as the axial thrust in one direction or in both directions.

One of the objects of the invention is to provide a bearing in which the rollers are well guided to prevent undue wear of the rollers and races and also to eliminate friction.

A further object of the invention is to provide a bearing having an inner raceway formed with a plurality of flanges thereon to provide thrust shoulders for the cylindrical rollers and also the conical rollers.

A further object is to provide in a roller bearing an inner race member having a cylindrical recess formed therein adapted to receive a plurality of cylindrical rollers and formed with conical diverging race-ways at both sides of the cylindrical race-way for receiving tapered rollers therein.

A further object is to provide a roller bearing provided with a one-piece inner race member and a three-piece outer race member, the inner race member being provided with race-ways for receiving cylindrical rollers and diverging raceways adjacent to the end walls thereof for receiving tapered rollers, and the outer race members each having a race-way for receiving one of the rows of rollers.

A still further object of the invention is to provide in a roller bearing of the class described a suitable guiding and retaining means for each of the row of rollers.

Having the above and other objects in view, the invention consists in a roller bearing which may be manufactured at low cost with the minimum number of parts and in which there is the minimum wear between the rollers and respective race-ways.

In the accompanying drawing which forms a part of this specification,

Figure 1:
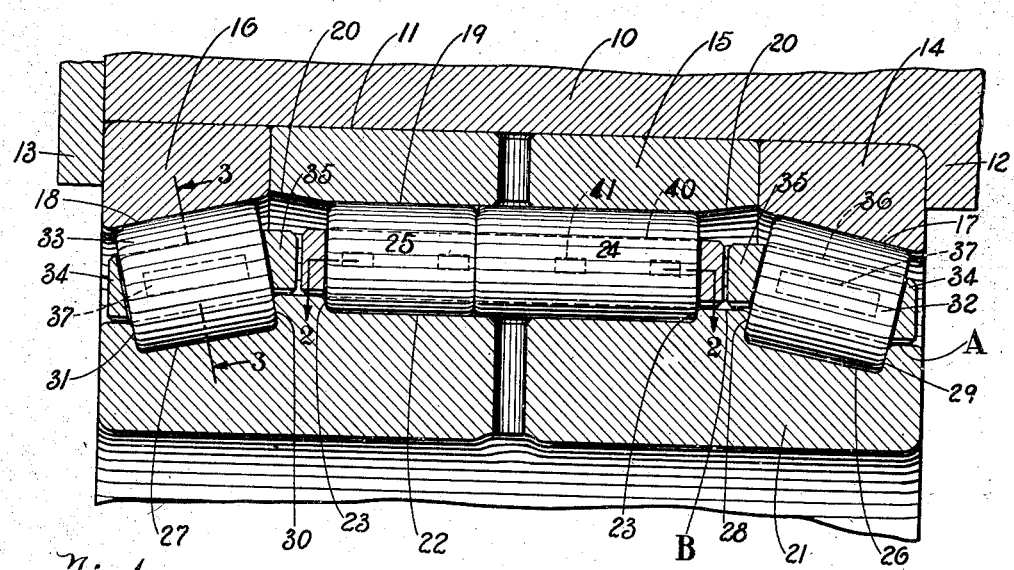
Fig. 1 is a fragmentary transverse sectional view through a roller bearing embodying the several features of my invention.
Figure 2:
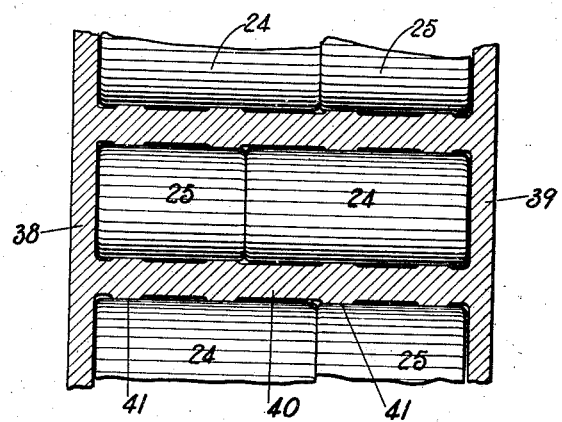
Fig. 2 is a sectional view taken on the line 2—2 of Fig. 1, showing the staggered rows of cylindrical rollers and the cage for maintaining the same in spaced relationship.
Figure 3:
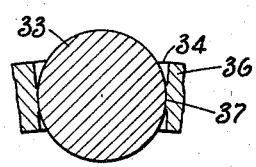
Fig. 3 is a transverse sectional view taken on the line 3—3 of Fig. 1, showing one of the tapered rollers and the cage therefor.

Heretofore roller bearings have been provided in which cylindrical rollers and tapered rollers have also been used but so far as I am aware bearings having a plurality of rows of cylindrical rollers together with diverging conical rollers have never been employed; that is, a bearing in which the cones point outwardly from the central transverse axis of the bearing.

In the present invention I prefer to use two or more rows of cylindrical rollers positioned end to end, the rollers being of varying lengths to thus eliminate the wearing of tracks in the race-ways, together with rows of diverging tapered rollers at each end of the cylindrical rollers to assist in carrying the radial thrust and also take up the axial thrust in either or both directions.

Referring to the accompanying drawing in which like numerals refer to like parts throughout the several views, I have illustrated a bearing adapted to be supported in a stationary part 10 having a cylindrical bore 11, a flange 12 at one side thereof and a separate retaining flange 13 at the opposite side thereof. Positioned in the bore 11 between the flanges 12 and 13 are a plurality of outer race members 14, 15 and 16. Race members 14 and 16 may be identical in construction except that they are positioned in right and left hand positions as shown with the conical bearing faces 17 and 18 converging toward each other or in other words with the cones extending inwardly. The central race member 15 is provided with a cylindrical race-way 19 extending adjacent to the ends thereof from which point this member is slightly tapered at both ends at 20 to provide clearance for assembling or disassembling the rollers hereinafter to be described in detail.

The inner race member 21 is provided with a cylindrical recess 22 having the shoulders adapted to receive the rollers 24 and 25. In this recess I prefer to use a plurality of rows of cylindrical rollers in end-to-end relationship and preferably with one of the rollers in each row which is longer than the adjacent roller in that row and of a different length than the abutting roller in the adjacent row. In the drawing, I have shown two of such rows of rollers 24 and 25, although my invention is not so limited as there may be cases where it will be found desirable to use three or even more rows of rollers.

The inner race member 21 is also provided with conical recesses 26 and 27 and with shoulders 28, 29, 30 and 31 formed thereon between which respectively are located the rows of conical rollers 32 and 33, the rows of rollers 32 being mounted in the conical recess 26 between the shoulders 28 and 29 and the rows of rollers 33 in the conical recess 27 between the shoulders 30 and 31. In such cases where I do not desire to use a full roller type bearing, cages or retainers for the respective rows of rollers are provided, the cages for the conical rollers 32 and 33 being preferably of identical construction, except that they are mounted in reverse relationship. Each of these cages comprises end walls 34 and 35 connected by integral spacing bars 36 formed with pads or projections 37 thereon adapted to contact with the periphery of the rollers 32 and 33 to maintain the same in correct axial relationship and to provide the minimum amount of frictional contact between the retainer and the respective roller. The end walls 34 of each of the cages is adapted to seat on a cylindrical portion A of the inner race member 21 and the end walls 35 seat on a larger cylindrical portion B of the inner race member 21.

If it is desired to use spaced cylindrical rollers for carrying the radial thrust, I provide a cage having end walls 38 and 39 formed with integral spacing bars 40 on which are formed projections or pads 41 adapted to contact with the respective rollers 24 and 25 and to provide for the minimum amount of frictional contact between the rollers and the cage.

Having thus described my invention, the same will be clearly understood by those skilled in the art and it will be further understood that the same is not to be limited to the specific details shown but is to be limited only by the subjoined claim.

What I claim is:

A roller bearing comprising, a one-piece inner race member having outwardly diverging tapered race-ways therein and a cylindrical race-way therebetween formed to provide shoulders at each end of each of said race-ways, a three-piece outer race member, a plurality of rows of cylindrical rollers positioned in said cylindrical race-way engaging with the central outer race member, the ends of the rollers in each row abutting against the end of the corresponding roller in the other row and rotatable relative thereto and the opposite ends of said rollers abutting against the shoulder at the respective end of the race-way, outwardly diverging rows of tapered rollers positioned in said tapered race-ways abutting against the shoulders at the ends thereof and engaging with the respective end outer race members, cages for each of the rows of tapered rollers and plurality of rows of cylindrical rollers comprising end walls encircling and seating on said inner race member, integral bars connecting the same, and pads on each of said bars to constrain said rollers from contacting with the full surfaces of said bars to provide the minimum amount of frictional contact between said rollers and cage.

KARL L. HERRMANN.